United States Patent
Bolton et al.

(12) 
(10) Patent No.: US 6,854,644 B1
(45) Date of Patent: Feb. 15, 2005

(54) METHOD OF ANALYZING MARKS MADE ON A RESPONSE SHEET

(75) Inventors: Steve Bolton, Omaha, NE (US); Tim Cordes, La Vista, NE (US); Herb Deutsch, Rockford, IL (US)

(73) Assignee: Election Systems & Software, Inc., Omaha, NE (US)

( * ) Notice: Subject to any disclaimer, the term of this patent is extended or adjusted under 35 U.S.C. 154(b) by 0 days.

(21) Appl. No.: 10/244,785

(22) Filed: Sep. 16, 2002

(51) Int. Cl.[7] .............................................. G06F 17/00
(52) U.S. Cl. .................. 235/375; 235/386; 235/454; 235/455; 235/460; 235/462.24; 382/181; 382/287
(58) Field of Search ................................. 235/375, 386, 235/454, 455, 460, 462.24; 382/181, 287

(56) References Cited

U.S. PATENT DOCUMENTS

| | | | | |
|---|---|---|---|---|
| 4,300,123 A | * | 11/1981 | McMillin et al. ........... | 235/436 |
| 4,357,596 A | | 11/1982 | Feilchenfeld | |
| 4,760,247 A | * | 7/1988 | Keane et al. ............... | 235/454 |
| 4,877,948 A | * | 10/1989 | Krueger ...................... | 235/449 |
| 5,039,847 A | * | 8/1991 | Morii et al. ................. | 235/379 |
| 5,046,005 A | | 9/1991 | Vilardebo et al. | |
| 5,113,454 A | | 5/1992 | Marcantonio et al. | |
| 5,159,471 A | * | 10/1992 | Satou et al. ................ | 358/466 |
| 5,248,872 A | | 9/1993 | Stewart | |
| 5,452,379 A | | 9/1995 | Poor | |
| 5,711,673 A | * | 1/1998 | Grundy, Jr. ................. | 434/353 |
| 5,832,138 A | * | 11/1998 | Nakanishi et al. .......... | 382/281 |
| 6,128,419 A | * | 10/2000 | Ukegawa ..................... | 382/317 |
| 6,176,429 B1 | | 1/2001 | Reddersen et al. | |
| 6,272,244 B1 | * | 8/2001 | Takahashi et al. .......... | 382/190 |

* cited by examiner

*Primary Examiner*—Steven S. Paik

(57) ABSTRACT

Described is a method of determining a choice made by a user by analyzing marks made on a response sheet by the user. The method employs a response sheet having response areas in which a user is directed to make marks indicating choices. The marked response sheet is then scanned to produce a digital image and associated data of each response area. That data is analyzed for characteristics according to a set of predetermined principles. These principles are based on the form of the response areas on the response sheet. The presence of certain characteristics in the data determines whether a mark was made in the response area and whether the mark constitutes a choice by the user.

12 Claims, 11 Drawing Sheets

| Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|
| 1 | 1 | 12 | N | All | None | Ignore | I |
| 2 | 2 | 9 | N | All | None | Ignore | I |
| 3 | 1 | 24 | N | All | None | Error | E1 |
| 4 | 2 | 9 | N | 9-48 | None | Error | E2 |
| 5 | 3 | 4 | C | All | 1,2,3,4 | Error | E3 |
| 6 | 8 | 2 | C | All | None | Error | E4 |
| 7 | 3 | 6 | N | 9-48 | 3,4 | Vote | V2 |
| 8 | 2 | 16 | N | 9-48 | None | Vote | V1 |
| 9 | 3 | 8 | N | 9-48 | None | Vote | V2 |
| 10 | 2 | 14 | C | All | None | Vote | V1 |
| 11 | 4 | 4 | C | 9-48 | 1,2,3,4 | Vote | V3 |
| 12 | 4 | 5 | C | 9-48 | 3,4 | Vote | V3 |
| 13 | 4 | 6 | C | All | None | Vote | V4 |
| 14 | 2 | 25 | C | All | None | Vote | V5 |
| 15 | 3 | 32 | C | All | None | Vote | V6 |

FIG. 8

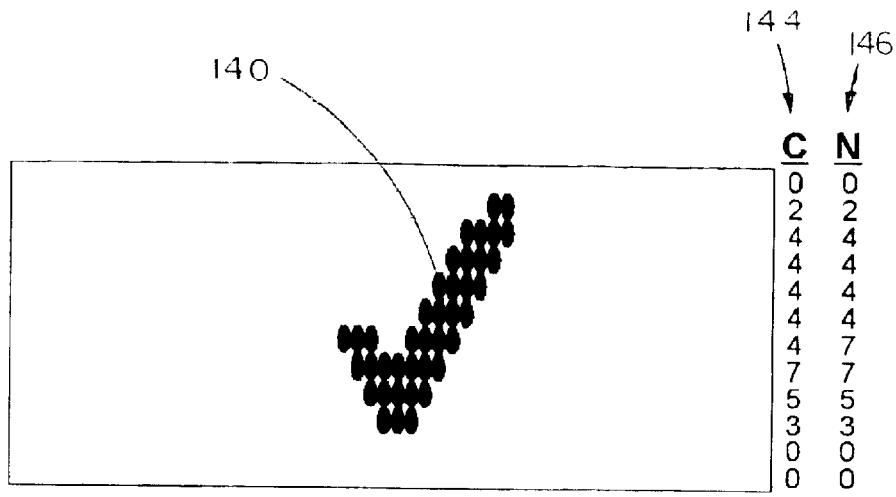

FIG. 9

| Match | Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|---|
| NO | 1 | 1 | 12 | N | All | None | Ignore | I |
| NO | 2 | 2 | 9 | N | All | None | Ignore | I |
| NO | 3 | 1 | 24 | N | All | None | Error | E1 |
| NO | 4 | 2 | 9 | N | 9-48 | None | Error | E2 |
| YES | 5 | 3 | 4 | C | All | 1,2,3,4 | Error | E3 |
| NO | 6 | 8 | 2 | C | All | None | Error | E4 |
| NO | 7 | 3 | 6 | N | 9-48 | 3,4 | Vote | V2 |
| NO | 8 | 2 | 16 | N | 9-48 | None | Vote | V1 |
| NO | 9 | 3 | 8 | N | 9-48 | None | Vote | V2 |
| NO | 10 | 2 | 14 | C | All | None | Vote | V1 |
| YES | 11 | 4 | 4 | C | 9-48 | 1,2,3,4 | Vote | V3 |
| NO | 12 | 4 | 5 | C | 9-48 | 3,4 | Vote | V3 |
| NO | 13 | 4 | 6 | C | All | None | Vote | V4 |
| NO | 14 | 2 | 25 | C | All | None | Vote | V5 |
| NO | 15 | 3 | 32 | C | All | None | Vote | V6 |

FIG. 9A

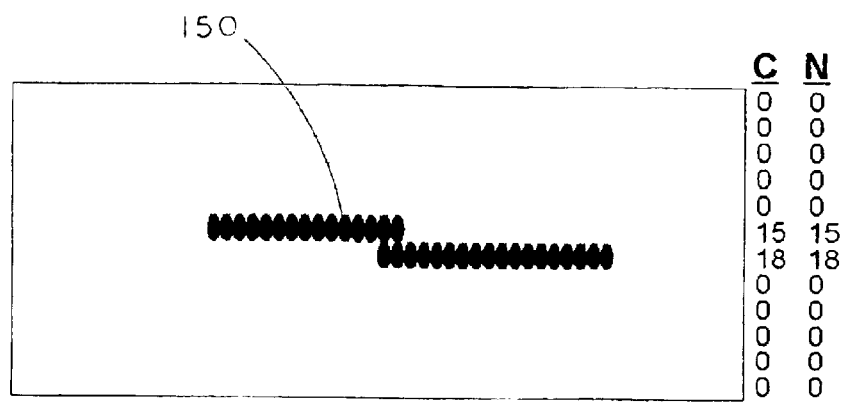

FIG. 10

| | Match | Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|---|---|
| | YES | 1 | 1 | 12 | N | All | None | Ignore | I |
| | YES | 2 | 2 | 9 | N | All | None | Ignore | I |
| 154 | NO | 3 | 1 | 24 | N | All | None | Error | E1 |
| | YES | 4 | 2 | 9 | N | 9-48 | None | Error | E2 |
| | NO | 5 | 3 | 4 | C | All | 1,2,3,4 | Error | E3 |
| | NO | 6 | 8 | 2 | C | All | None | Error | E4 |
| | NO | 7 | 3 | 6 | N | 9-48 | 3,4 | Vote | V2 |
| | NO | 8 | 2 | 16 | N | 9-48 | None | Vote | V1 |
| | NO | 9 | 3 | 8 | N | 9-48 | None | Vote | V2 |
| | YES | 10 | 2 | 14 | C | All | None | Vote | V1 |
| 156 | NO | 11 | 4 | 4 | C | 9-48 | 1,2,3,4 | Vote | V3 |
| | NO | 12 | 4 | 5 | C | 9-48 | 3,4 | Vote | V3 |
| | NO | 13 | 4 | 6 | C | All | None | Vote | V4 |
| | NO | 14 | 2 | 25 | C | All | None | Vote | V5 |
| | NO | 15 | 3 | 32 | C | All | None | Vote | V6 |

FIG. 10A

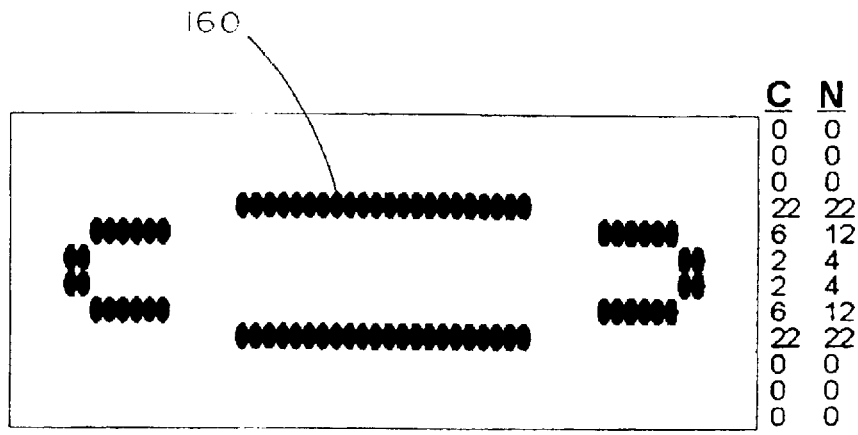

FIG. 11

| Match | Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|---|
| YES | 1 | 1 | 12 | N | All | None | Ignore | I |
| YES | 2 | 2 | 9 | N | All | None | Ignore | I |
| NO | 3 | 1 | 24 | N | All | None | Error | E1 |
| NO | 4 | 2 | 9 | N | 9-48 | None | Error | E2 |
| NO | 5 | 3 | 4 | C | All | 1,2,3,4 | Error | E3 |
| NO | 6 | 8 | 2 | C | All | None | Error | E4 |
| NO | 7 | 3 | 6 | N | 9-48 | 3,4 | Vote | V2 |
| NO | 8 | 2 | 16 | N | 9-48 | None | Vote | V1 |
| NO | 9 | 3 | 8 | N | 9-48 | None | Vote | V2 |
| NO | 10 | 2 | 14 | C | All | None | Vote | V1 |
| NO | 11 | 4 | 4 | C | 9-48 | 1,2,3,4 | Vote | V3 |
| NO | 12 | 4 | 5 | C | 9-48 | 3,4 | Vote | V3 |
| NO | 13 | 4 | 6 | C | All | None | Vote | V4 |
| NO | 14 | 2 | 25 | C | All | None | Vote | V5 |
| NO | 15 | 3 | 32 | C | All | None | Vote | V6 |

FIG. 11A

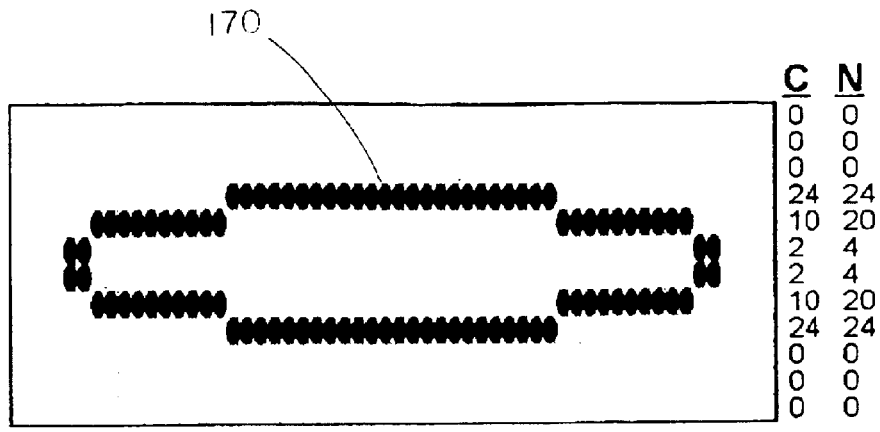

FIG. 12

| Match | Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|---|
| YES | 1 | 1 | 12 | N | All | None | Ignore | I |
| YES | 2 | 2 | 9 | N | All | None | Ignore | I |
| YES | 3 | 1 | 24 | N | All | None | Error | E1 |
| YES | 4 | 2 | 9 | N | 9-48 | None | Error | E2 |
| NO | 5 | 3 | 4 | C | All | 1,2,3,4 | Error | E3 |
| NO | 6 | 8 | 2 | C | All | None | Error | E4 |
| NO | 7 | 3 | 6 | N | 9-48 | 3,4 | Vote | V2 |
| NO | 8 | 2 | 16 | N | 9-48 | None | Vote | V1 |
| NO | 9 | 3 | 8 | N | 9-48 | None | Vote | V2 |
| NO | 10 | 2 | 14 | C | All | None | Vote | V1 |
| NO | 11 | 4 | 4 | C | 9-48 | 1,2,3,4 | Vote | V3 |
| NO | 12 | 4 | 5 | C | 9-48 | 3,4 | Vote | V3 |
| NO | 13 | 4 | 6 | C | All | None | Vote | V4 |
| NO | 14 | 2 | 25 | C | All | None | Vote | V5 |
| NO | 15 | 3 | 32 | C | All | None | Vote | V6 |

FIG. 12A

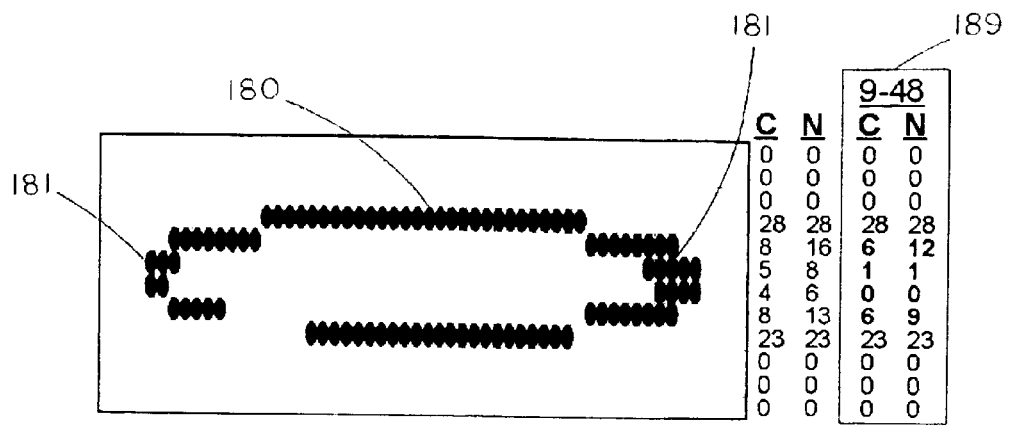

FIG. 13

| Match | Table Entry # | # of Rows | # of Pixels Per row | Pixel Pattern Contiguous, Or Non-Contiguous | Cell Range | Previous Category | Mark Classification Ignore, Error, Or Vote | Mark Code |
|---|---|---|---|---|---|---|---|---|
| YES | 1 | 1 | 12 | N | All | None | Ignore | I |
| YES | 2 | 2 | 9 | N | All | None | Ignore | I |
| YES | 3 | 1 | 24 | N | All | None | Error | E1 |
| YES | 4 | 2 | 9 | N | 9-48 | None | Error | E2 |
| NO | 5 | 3 | 4 | C | All | 1,2,3,4 | Ignore | I |
| NO | 6 | 8 | 2 | C | All | None | Error | E4 |
| NO | 7 | 3 | 6 | N | 9-48 | 3,4 | Ignore | I |
| NO | 8 | 2 | 16 | N | 9-48 | None | Ignore | I |
| NO | 9 | 3 | 8 | N | 9-48 | None | Ignore | I |
| NO | 10 | 2 | 14 | C | All | None | Vote | V1 |
| NO | 11 | 4 | 4 | C | 9-48 | 1,2,3,4 | Ignore | I |
| NO | 12 | 4 | 5 | C | 9-48 | 3,4 | Vote | V3 |
| NO | 13 | 4 | 6 | C | All | None | Vote | V4 |
| NO | 14 | 2 | 25 | C | All | None | Vote | V5 |
| NO | 15 | 3 | 32 | C | All | None | Vote | V6 |

FIG. 13A

| Table Entry # | # of Rows | # of Pixels Per row | Pixel Pattern Contiguous, Or Non-Contiguous | Mark Classification Ignore, Error, Or Vote | Mark Code |
|---|---|---|---|---|---|
| 1 | 1 | 36 | N | Error | E1 |
| 2 | 1 | 38 | N | Vote | V1 |
| 3 | 7/N | 20 | N | Error | E2 |
| 4 | 3 | 38 | N | Vote | V2 |
| 5 | 4 | 38 | N | Vote | V3 |

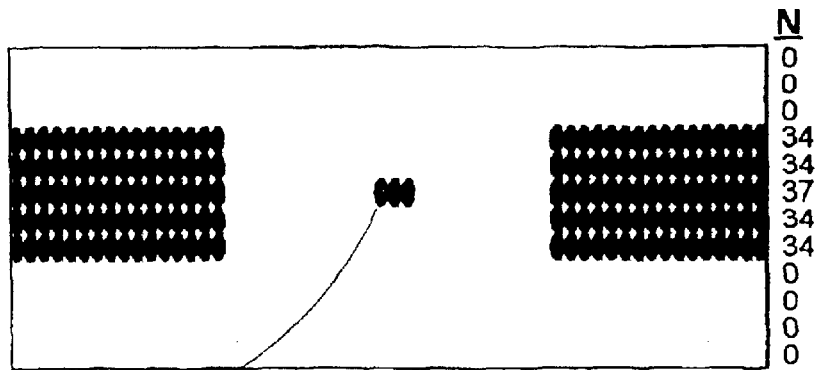

FIG. 16

| Match | Table Entry # | # of Rows | # of Pixels Per row | Pixel Pattern Contiguous, Or Non-Contiguous | Mark Classification Ignore, Error, Or Vote | Mark Code |
|---|---|---|---|---|---|---|
| YES | 1 | 1 | 36 | N | Error | E1 |
| NO | 2 | 1 | 38 | N | Vote | V1 |
| NO | 3 | 7/N | 20 | N | Error | E2 |
| NO | 4 | 3 | 38 | N | Vote | V2 |
| NO | 5 | 4 | 38 | N | Vote | V3 |

FIG. 16A

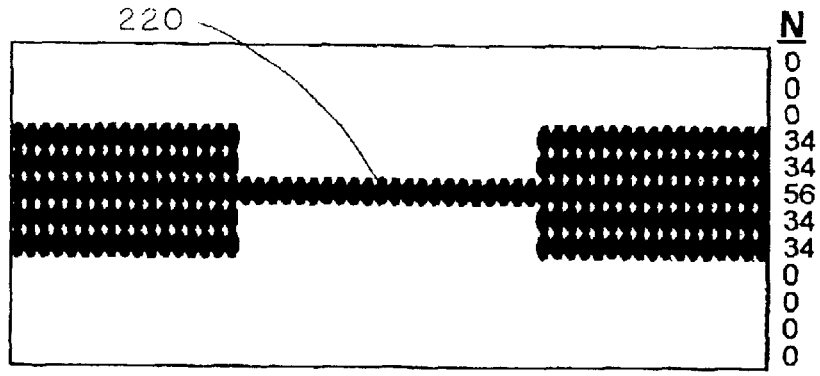

FIG. 17

| Match | Table Entry # | # of Rows | # of Pixels Per row | Pixel Pattern Contiguous, Or Non-Contiguous | Mark Classification Ignore, Error, Or Vote | Mark Code |
|---|---|---|---|---|---|---|
| YES | 1 | 1 | 36 | N | Error | E1 |
| YES | 2 | 1 | 38 | N | Vote | V1 |
| NO | 3 | 7/N | 20 | N | Error | E2 |
| NO | 4 | 3 | 38 | N | Vote | V2 |
| NO | 5 | 4 | 38 | N | Vote | V3 |

FIG. 17A

METHOD OF ANALYZING MARKS MADE ON A RESPONSE SHEET

BACKGROUND OF THE INVENTION

1. Field of the Invention

This invention relates to a method of determining a choice made by a user, as indicated by the user's marking a response sheet, by analyzing the marks made on the response sheet.

2. Description of the Prior Art

Elections, academic tests, referendums, surveys, gambling schemes, and other endeavors often require the accurate counting, tabulation, or analysis of marks made on response sheets or ballot. Often, machines are used to perform this task, as manual counting is generally too slow and unreliable for most purposes. These machines are expected to provide the same, or better, accuracy than manual counting and to do so with increasing speed.

Response sheets are a form of a multiple-choice questionnaire. A user votes or selects a choice by making some sort of mark next to the name or choice printed on the sheet. Accurate counting of marked response sheets requires optically scanning the sheets, reliably detecting or reading every mark made on a response sheet and recognizing whether it is a valid vote or choice.

There are numerous different methods and apparatus pertaining to optically scanning documents, and detecting and recognizing marks on them. Most use some sort of pre-printed form and a scanning device that is adapted to the particular format of the form. For example, U.S. Pat. No. 4,813,708 describes a scanner for detecting timing marks and written marks on a response sheet that includes a read head that has tungsten lamps illuminating the sheet with infra-red light and phototransistors to sense infra-red light reflected from the surface of the sheet. A response sheet to be scanned or read is transported past the row of phototransistors and a lens focuses the image of the illuminated response sheet on to the phototransistors. The ink used for making the marks absorbs infra-red light. Therefore, when a phototransistor senses a significant drop of brightness in the infra-red light reflected from the response sheet, it is likely due to a passing mark. When the phototransistors sense less infra-red light, a mark indicating a valid choice is deemed to have been detected. The meaning of the choice is determined by the location of the mark on the response sheet and the choice is recorded.

Other systems have been designed that improve upon this system, such as that described in U.S. Pat. No. 5,248,872. Each of the prior art devices uses the reflection or absorption of light to determine the presence of a mark on a response sheet. Such systems have several shortcomings. First, the sheet must be filled out in an exact manner to register correctly. These systems do not register as choices marks that are commonly made to indicate such choices, such as check marks, and which marks are easily discernable as choices to human eyes.

Other disadvantages of these systems stem from the fact that a response area is treated as the smallest unit of the response sheet that is analyzed. Because the response area is not recorded and analyzed as a conglomeration of much smaller areas, no automated analysis is available for marginal or, partial markings in a response area.

Election Systems & Software, Inc. developed its Model 100 Precinct Counter with a Contact Image Sensor (CIS) as its reading technology. The CIS integrates a light source, lens, sensor, and video signal amplifier into a single module. It is essentially the same type of CCD or CMOS sensor that is used in fax machines and page scanners, which are well known in the art and is capable of reading the entire width of an 8.5" wide response sheet. With this capability, the system was designed to employ readily available computer hardware and software to specify which segments of the sensor would be used to read the response sheet and to record, analyze and classify the generated data.

The employment of the CIS created a number of challenges regarding the accuracy, consistency, and the selection of marking devices employed in the system. Response sheets printed out of specifications, overly sensitive read heads, and smudged sensors created problems that lead to false readings. These problems lead to the development of a Model 100 system setup routine in which blank response sheets were fed into the machine and the sensitivity of the sensors was adjusted to eliminate false readings. This solution proved to be less than ideal, however, because the sensitivity of the sensors was occasionally too low to give an accurate reading of the response sheet. Also, the accuracy of the machines was often subject to the failings of the operator. Furthermore, inaccuracies were detected due to improper ballot printing and skewed feeding of sheets through the system.

SUMMARY OF THE INVENTION

The method described herein produces accurate results in the analysis and tabulation of choices made by a user on a response sheet. The method employs a response sheet having response areas in which a user is directed to make marks indicating choices. The marked response sheet is then fed into a scanner that produces a digital image of each response area and translates the image into data. That data is analyzed for characteristics according to a set of predetermined principles. These principles are based on the form of the response sheet. The presence of certain characteristics in the data determines whether a mark was made in the response area and whether the mark constitutes a choice.

It is therefore a principal object of the invention to provide a method of mark detection that is more accurate than those that are currently available.

Yet another object of the invention is to provide a method of mark detection that is able to recognize the pattern of the blank response area and effectively separate the indicia of that response area from a mark made by a user.

Yet another object of the invention is to provide a method of mark detection that has superior sensitivity and ability to recognize small marks.

Yet another object of the invention is to provide a method of mark detection that uses state of the art scanning equipment.

Still another object of the invention is to provide a method of mark detection that does not require calibration for different machines based on the quality of sensors or pre-printed response sheets.

These and other objects will be apparent to those skilled in the art.

BRIEF DESCRIPTION OF THE DRAWINGS

FIG. 8 is a table of categories of characteristics to be employed in the analysis of an optical scan of an oval response area.

FIG. 9 is a diagram illustrating a working example of the data produced by an optical scan of an oval response area marked with a check mark.

FIG. 9A is a table of categories of characteristics as employed in the analysis of an optical scan of an oval response area marked with a check mark.

FIG. 10 is a diagram illustrating a working example of the data produced by an optical scan of an oval response area marked with a thin horizontal line.

FIG. 10A is a table of categories of characteristics as employed in the analysis of an optical scan of an oval response area marked with a thin horizontal line.

FIG. 11 is a diagram illustrating a working example of the data produced by an optical scan of a blank oval response area that is darker than normal.

FIG. 11A is a table of categories of characteristics as employed in the analysis of an optical scan of a blank oval response area that is darker than normal.

FIG. 12 is a second diagram illustrating a working example of the data produced by an optical scan of a blank oval response area that is darker than normal.

FIG. 12A is a table of categories of characteristics as employed in the analysis of the optical scan illustrated in FIG. 12 of a blank oval response area that is darker than normal.

FIG. 13 is a diagram illustrating a working example of the data produced by an optical scan of an abnormal blank oval response area.

FIG. 13A is a table of categories of characteristics as employed in the analysis of an optical scan of an abnormal blank oval response area.

FIG. 16 is a diagram illustrating a working example of the data produced by an optical scan of a mark resembling a dot made in an arrow response area.

FIG. 16A is a table of categories of characteristics as employed in the analysis of an optical scan of a mark resembling a dot made in an arrow response area.

FIG. 17 is a diagram illustrating a working example of the data produced by an optical scan of a horizontal line in an arrow response area.

FIG. 17A is a table of categories of characteristics as employed in the analysis of an optical scan of a horizontal line in an arrow response area.

DESCRIPTION OF THE PREFERRED EMBODIMENT

Figure 1:
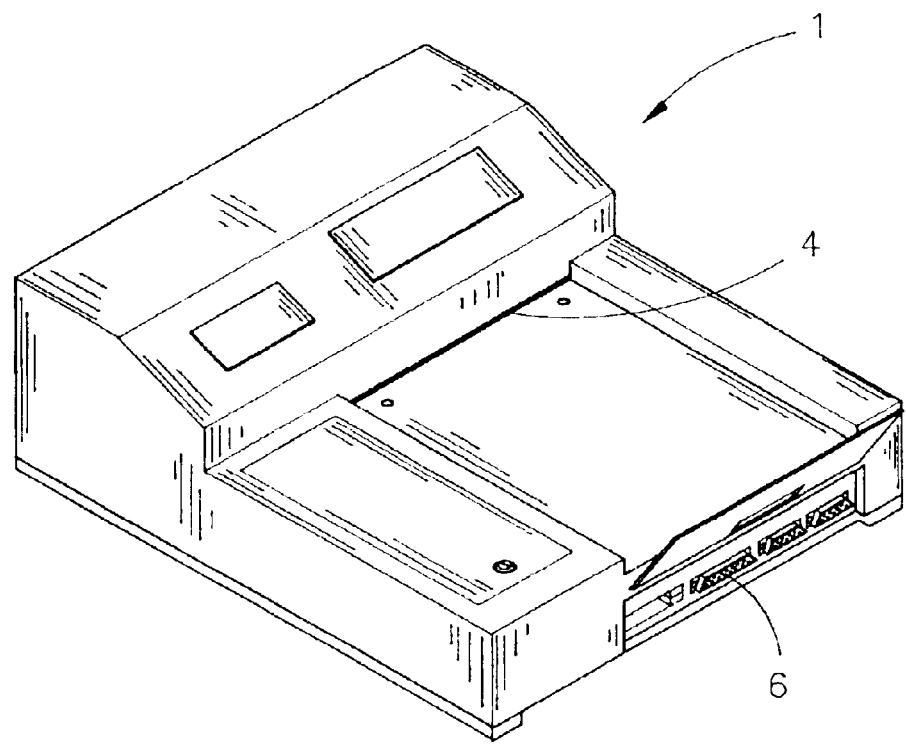
FIG. 1 is a perspective view of a ballot counting machine.
Figure 2:
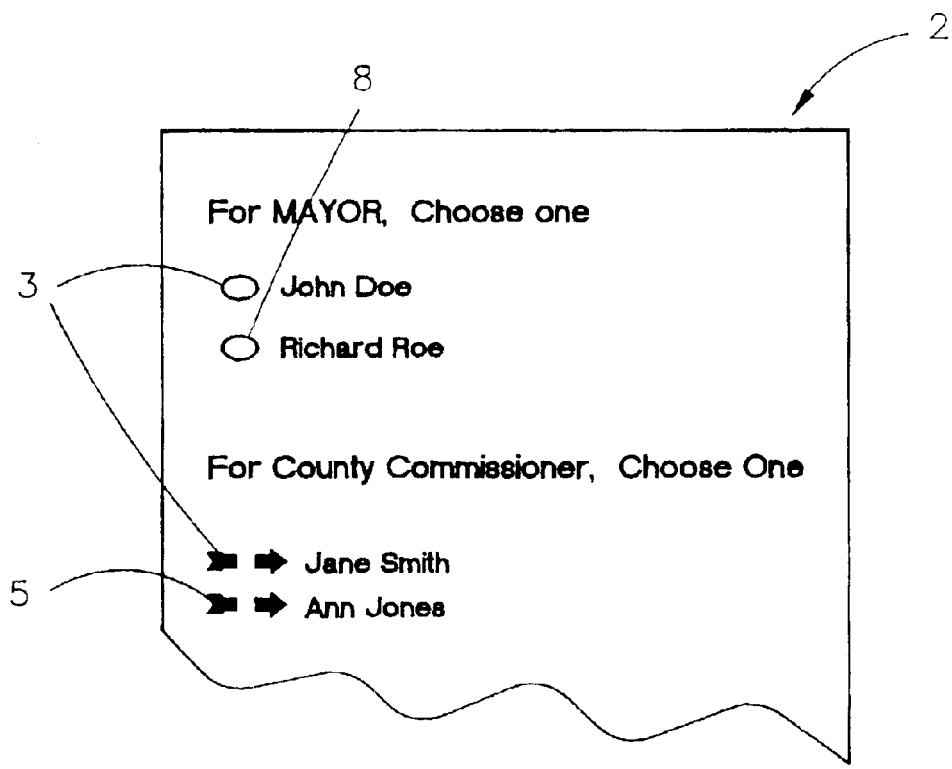
FIG. 2 is a view of a sample response sheet.

Voting systems and other systems that use machines 1, such as that shown in FIG. 1, to read multiple uniform response sheets 2 such as that shown in FIG. 2 require accuracy and reliability. Intelligent Mark Recognition (IMR) is a method that employs scanning and computer technology that is well known in the art to improve the accuracy and reliability of the automated reading of such response sheets by accurately reading individual response areas 3, typically ovals 8, marked by a voter or other user on a response sheet. Conventionally, a ballot counting machine 1 will have feeding means 4 to feed a ballot or response sheet 2 and means to analyze that response sheet (not shown) such as an optical scanner. The ballot counting machine 1 will also generally have means for storing (not shown) data generated by the analysis of the response sheet and means for communicating data 6 to a central processor (not shown).

By comparing data retrieved from an optical scan of the response sheet 2, and particularly of each response area 3 on the response sheet 2, with that of a constant data set, IMR can determine if the reading taken from the response area 3 fits the pattern of a typical voter mark and can classify that data.

Figure 3:
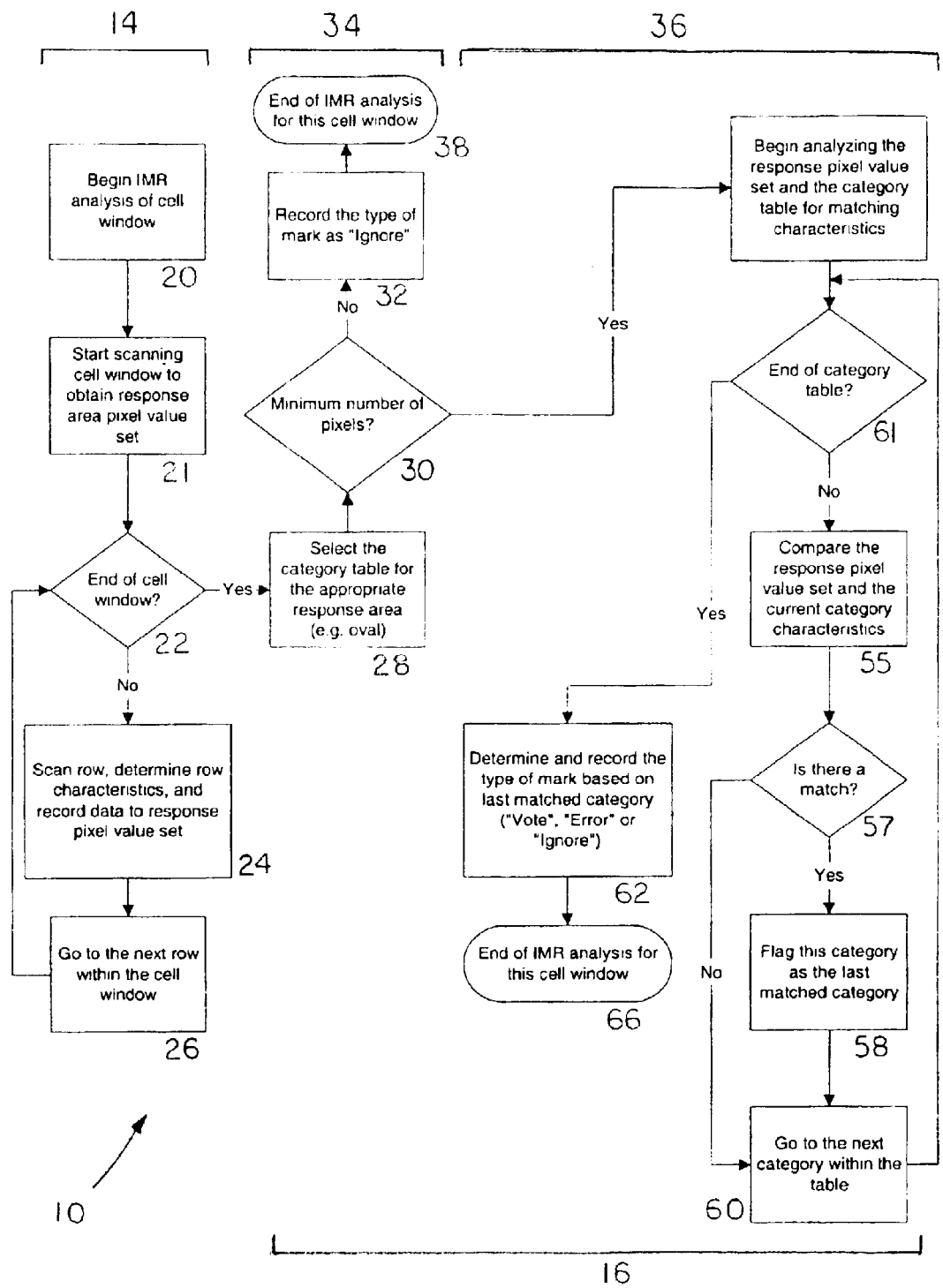
FIG. 3 is flowchart showing the steps in the method of analyzing a mark.

There are two separate processes involved in the IMR method 10. The first process is the creation of data 14 based on a digital image of a response area 3 using a Contact Image Sensor or similar imaging mechanism (CIS). The second process is a mark discrimination computer routine 16 that analyzes the data based on the digital image to determine if the data represents a valid voter mark. These processes and the steps involved in each are shown in FIG. 3.

These processes may be fulfilled through the employment of imaging, processing, and other computer hardware and associated software that are readily available and are well known in the art.

In the preferred embodiment, the CIS is a high-resolution device that reads at 200 dpi (200 sensors per inch). When the CIS is scanning a response area 3, it captures a digital image that may be approximately 0.24" high, and 0.28" wide around the response area 3, which will be, for this example, an oval. This 0.24"×0.28" area is referred to as the "cell window". Of course, different digital imaging processes and differently sized cell windows are acceptable. In this example, and in the examples to follow, with 200 sensors per inch and a cell width of 0.28", there are actually 56 sensors reading each response area. The response area 3 is scanned horizontally as the response sheet 2 is moved across the sensors. Once the scanning has begun 20, the IMR method 10 will start scanning the cell window 21 in horizontal rows. The IMR method 10 will then employ an imaging routine 22 to determine if the horizontal row that was scanned is the last of the rows within the cell window. If not, the IMR method 10 will record the characteristics of the pixels in that row 24 in a response pixel value set and proceed to scan the next row 26. In this example, 12 horizontal rows are scanned in each cell window. This 12-horizontal scan row 102 by 56 sensor 104 matrix 100 constitutes to 672 total sensor readings 106 for each cell window. When any one of these 672 readings 106 results in a positive reading, indicating the presence of a mark on the response sheet, it is recorded as a pixel. These recorded readings constitute a response pixel value set that is analyzed according to the IMR method 10. The response pixel value set is analyzed in light of a control pixel value set, including a category table 40 that is appropriate for the given response area 3. The category table 40 for an oval is shown in FIG. 8. The IMR process 10 requires the selection 28 of a category table that corresponds to the response area 3 of the response sheet 2.

Figure 4:
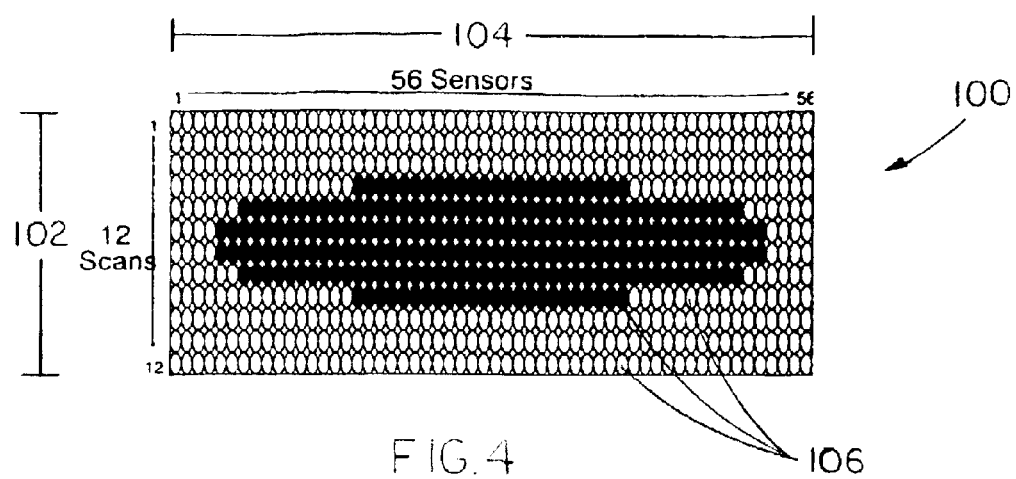
FIG. 4 is a diagram illustrating the data produced by an optical scan of an oval response area that is properly marked.

The examples shown in FIGS. 4, 5, 6, 7, 9, 10, 11, 12 and 13 assume that each response area 3 is oval in shape and that the settings described above are applied. The image in FIG. 4 depicts the cell window that is read around the response area 3; and is a magnified view of what the CIS will read when an oval is properly marked. Out of 672 possible readings, this marked oval has a total pixel count of 232. An oval that is properly marked will typically read between 200 and 250 pixels.

Figure 5:
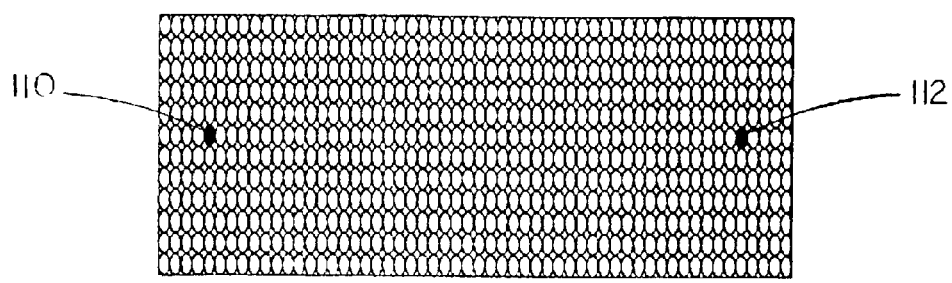
FIG. 5 is a diagram illustrating the data produced by an optical scan of an unmarked oval response area.
Figure 6:
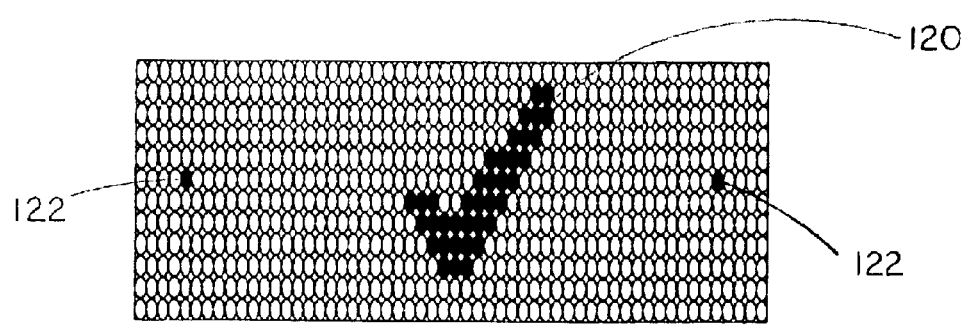
FIG. 6 is a diagram illustrating the data produced by an optical scan of an oval response area marked with a check mark.
Figure 7:
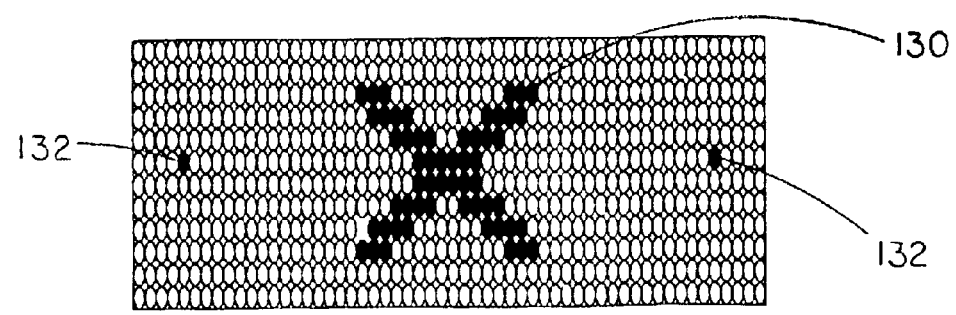
FIG. 7 is a diagram illustrating the data produced by an optical scan of an oval response area marked with an "X.".

FIGS. 5, 6, and 7 show the typical cell window readings that will result with various typical marks. FIG. 5 shows how the CIS should read an unmarked response area. If the oval is printed on the response sheet 2 lightly enough, the oval should be practically invisible to the CIS. It will normally not read more than two pixels, one each on the left end 110 and the right end 112 of the oval. FIG. 6 shows how a typical check mark 120 would appear to the CIS. This check mark produced 37 pixels plus two 122 from the oval for a total of 39 pixels. FIG. 7 shows how an "X" mark 130 would appear to the CIS. This "X" produced 56 pixels plus two 132 from the oval for a total of 58 pixels.

The creation of a digital image of a mark 14 is only the first process in the IMR method 10. The other major process of the IMR method 10 is the discrimination process 16. The discrimination process 16 comprises a method of analyzing the response pixel value set produced by the CIS and of determining which response pixel value sets represent marks and which do not. It should be noted that while it is obviously desirable to detect every mark that passes the sensor, it is equally important that marks are not falsely detected where they are not present. Ultimately, the IMR discrimination process 16 must be able to reliably discriminate between light marks made by the user that are intended to signify choices and false signals caused by poorly printed ballots, paper imperfections, creases and other factors.

The IMR discrimination process 16 is very time consuming. The equipment commonly used to tabulate votes is often highly taxed and works optimally when the entire discrimination process 16 is not conducted for cell windows that clearly do not indicate a choice. For this reason, the discrimination process may have two phases. In the first phase 34, an initial threshold pixel level may be determined.

After scanning a response area, the total sum of the pixels in each response pixel value set is compared to a predetermined threshold pixel value 30. This predetermined threshold pixel value may be set at, for example, a value of 30 pixels. If the total pixel count from a given response pixel value set 3 equaled or exceeded this value, it would then be subject to the second phase 36 of the discrimination process. If the pixel count from a response pixel value set was less than the threshold pixel value, the cell window would be registered as an "Ignore" mark type 32, ending the analysis 38. The more elaborate second phase 36 of the discrimination process would be obviated, thereby saving resources.

The IMR method 10 classifies the response pixel value set by comparison to a control pixel value set featuring different categories of characteristics 41 in a category table 40 as shown in FIG. 8. Each category of characteristics describes a type of mark. The three general types of marks are "Vote" (or "Valid or "Mark"), "Error" (or "Invalid"), and "Ignore" (or "Non-vote" or "Blank"). A category table 40 lists, in a specific order, the characteristics for each category 41. The IMR discrimination process 16 begins when the characteristics of the response pixel value set are compared to the characteristics of the first category 55. If the characteristics of the response pixel value set are determined 57 match the characteristics of the first category, the category is flagged 58 and the characteristics of the response pixel value set are compared to the characteristics of the next category 60. The IMR discrimination process 16 analyzes the response pixel value set against the table of categories 40 from top to bottom by determining 61 whether each category 41 in the category table 40 has been subject to comparison. The IMR discrimination process 16 flags each category 41 that matches the data in the response pixel value set. The last category in the category table 40 to be matched is determined 62 to be the given mark's identifying category. Each category 41 is assigned a value for a type of mark. The type of mark indicated by the identifying category is then used to classify the mark as "Vote", "Error", or "Ignore". The IMR method 10 then ends 66.

The core mechanism of the discrimination process 16 is the counting and analyzing of the number of pixels in a row, one row at a time. Thus each category 41 contains a number of rows value 42 and a number of pixels value 44. Each category 41 may also includes characteristics such as whether the pixels or rows must be consecutive 46, whether the outside edges of the cell window area should be ignored 48, and whether previous categories matched should be considered 50 in determining if the subject category is matched by the response pixel value set. As the response area 3 is scanned, each of these characteristics is determined.

In the preferred embodiment for analysis of oval response areas, the following five characteristics are used in the category table 40 to describe each category 41:

Number of Rows The value of this characteristic is the number of scan lines containing a specified number of pixels within the cell window that must be met to match the given category 41. The rows must be on consecutive scan lines Number of Pixels per Row The value of this characteristic is the minimum number of pixels, per scan line, that must be met to match the given category 41.

Pixel Pattern—Contiguous or Non-Contiguous The value of this characteristic indicates whether the pixels in the row needs to be contiguous, or can be scattered in the row (i.e. non-contiguous).

Cell Range The value of this characteristic is the cell range in which these pixel patterns must occur. In the example in FIG. 4, where the characteristic is "All", the entire cell window is analyzed. Where the characteristic is 9-48, only the middle 40 sensor readings of the 56 sensor readings 104 in each row of the cell window are analyzed. The first eight sensor readings and last sensor readings in each row are not analyzed.

Previous Category This characteristic excludes certain response pixel value sets based upon the immediate previous category for which the response pixel value set has been determined to be matched. Note that this is only used if the last category matched is one specified within this characteristic. For this purpose, each category 41 is assigned a number. For example, if the value of this characteristic is set to category numbers 1, 2, 3, or 4 and category 6 is currently being analyzed, and if all other characteristics within category 6 are found within the response pixel value set, but the last category matched by the response pixel value set was category number 4, category 6 will not be considered a match. If, however, with the same configuration, all other characteristics within category 6 are found within the response pixel value set, and the last category matched by the response pixel value set was category number 5, then category 6 will be considered a match, because category number 5 is not in the "Previous Category" characteristic.

Each category 41 contains a classification 52 of the type of mark that it represents. These are shown as part of the control pixel value set in FIG. 8. The last category to be matched determines the classification of the type of mark 52 indicated in the response area 3. For example, if category 11 of category table 41 is the last category for which the control pixel value set was determined to have been matched, and category 11 contains the type designation "Vote," the IMR discrimination process 16 will classify the response pixel value set, and the mark in the response area from which that value set was derived, as a vote.

Additionally, each category 41 may contain a designation "Mark Code." 54 This indicates additional information about the type of mark that was recognized in each response area 3 on the response sheet 2. As an example, in FIG. 8, an "I" mark code may indicate that the IMR method 10 may have detected a very small mark, but that it was too small to be recognized as a vote. An "E" mark code indicates that the method 10 read a slightly larger mark, toom large to be disregarded, but not large enough to be considered a valid vote. The benefit of these codes is that if the mark's identifying category is associated with an "E" code, the response sheet 2 may be returned to the user to make sure it is tabulated accurately, and give the user the opportunity to repair an error. A "V" mark code indicates that the mark fits the pattern of a typical user mark and will be recorded as a vote.

The "V" and "E" mark codes may be followed with a number to help better identify what type of mark was detected. In this example, the bolder the user's mark, the higher the mark code number. Table 1 below describes the typical mark that will be associated with each of these codes. These mark codes exist to present a fair representation of the user's mark, however representations can vary depending on a number of factors including marking device type, tip width, and sensor capability.

TABLE 1

| Code | Mark Description |
|------|------------------|
| E1 | Possibly a narrow horizontal line that cannot be considered a valid vote. |
| E2 | Possibly a lightly filled oval, which cannot be considered a valid vote. |
| E3 | Possibly a weak check mark or X, too weak to be considered a valid vote. |
| E4 | Possibly a tall narrow check mark or slash, too narrow to be considered a valid vote. |
| V1 | A horizontal line or light mark, significant enough to be considered a vote. |
| V2 | A lightly filled oval, dark enough and big enough to be considered a vote. |
| V3 | A check mark/slash, or light X, significant enough to be considered a vote. |
| V4 | A dark X or check. Also possibly a darker mark covering a substantial portion of the oval. |
| V5 | Oval filled in well, but not completely. |
| V6 | A completely filled (or nearly complete) oval. |

The following examples display the IMR method 10 and its application to common user marks in a response area 3:

Example 1

FIG. 9 is an example of the response pixel value set derived from a typical check mark 140. The pixel counts for each row are displayed to the right of the image. The numbers under the heading "C" 144, indicate the highest number of contiguous pixels in that row. The numbers under the heading "N", 146 indicate the number of non-contiguous or total pixels in the row. This response pixel value set would match the indicated categories in the category table 148 in FIG. 9A.

In this example, category numbers 5 and 11 were matched. The last category matched—the identifying category 149 for this response pixel value set—was 11, which indicates that this user's mark type is a "Vote" having a mark code of V3.

Example 2

FIG. 10 is an example of the response pixel value set derived from a thin horizontal line 150. This response pixel value set would match the indicated categories in the category table 152 in FIG. 10A.

Note that Category numbers 1, 2, 4 and 10 were all matched. Category 4 154 was matched which indicates an "Error" mark type. But since category 10(a "Vote" mark type) was also matched, category 10 is the identifying category 156 for this response pixel value set. The "Error" mark type associated with category 4 is overwritten and the mark is counted as a "Vote" having mark code V1.

Example 3

FIG. 11 is an example of the response pixel value set derived from a blank oval that is darker than normal 160. This can be the result of the ovals being printed with lines that are thicker than specifications, a dirty sensor, folds in the response sheet 2, system over-sensitivity, or any combination of these problems. The total pixel count from this sensor reading and from the sensor readings in Examples 4 and 5 are significant and display the capabilities of the IMR method 10. This response pixel value set in Example 3 would match the indicated categories in the category table 162 in FIG. 11A.

Note that only category numbers 1 and 2 were matched, and that category 2, as the last matched category is the identifying category 164 for the response pixel value set. These two categories only produce "Ignore" codes. This means that the IMR method 10 will disregard the reading of this blank oval 160. The effect of this flag will be demonstrated in Example 5.

Example 4

FIG. 12 is another example of the response pixel value set derived from a blank oval that is darker than normal 170. In this example, the oval appears so dark that the IMR method 10 cannot accept the reading. This response pixel value set would match category numbers 1, 2, 3, and 4 as indicated in the category table 172 in FIG. 12A.

Since category 4 174 was the last category matched, the IMR method 10 will indicate an "Error" message, the mark type associated with that category. If readings such as this occur frequently, the operator of the ballot counting machine 1 has notice that it is likely that the machine 1 is on the verge of failure and should not be in operation.

Example 5

FIG. 13 is an example of the response pixel value set derived from another abnormal blank oval reading 180. The cause of a reading like this is usually due to a combination of factors, such as the factors explained in the Examples 3 and 4; the introduction of a fold or crease in the response sheet 2; or any paper transport anomaly that allows the response sheet 2 to pull away from or otherwise interfere with the CIS sensor. In this example, the ends of the oval 181 appear very dark. This response pixel value set would match the indicated categories in the category table 182 in FIG. 13A Categories numbers 1, 2, 3, and 4 were all matched, as in the Example 4. But in this example, many of the categories (5, 7, 8, 9 and 11) that are designed to recognize substandard marks, such as check marks and "X"s, have characteristics that match the response pixel value set for the row and pixels counts. In this example, the "Cell Range" characteristic 184 and the "Previous Category" characteristic 186 assist in the accuracy of the IMR method 10. Several of these categories are described below to help describe the IMR method.

Category 5— This category contains the pattern of three rows of four contiguous pixels. The right side of the oval contains this pattern. But since its "Previous Category" characteristic value includes category 4, this category will not be considered a match, as category 4 was the last category matched.

Category 7—This is a "Vote" category that contains the pattern of three rows of six non-contiguous pixels. The ends of the oval 181 contain this non-contiguous pattern. But this category is not a match for two reasons. The first reason is that this category has a specified cell range characteristic 184 of 9-48. This means that the first eight sensor readings 187 and the last eight sensor readings 188 in each row are disregarded. The numbers 189 displayed on the right of FIG. 13 under the heading "9-48" indicate the pixel counts when these outside pixels are disregarded. The requirement of three rows of six non-contiguous pixels is not met given this restriction. Therefore, the response pixel value set does not match category 7 and a vote under that category will not be tabulated. An additional reason that this category will not be determined to be a match is that, like category 5, it includes category 4 as a "Previous Categories" characteristic 186. Category 4 is still the last matched category.

Categories 8 and 9—These are both "Vote" categories in which the row and pixel count values are matched, but since the first eight and last eight sensor readings in each row are disregarded, the response pixel value set no longer matches the characteristics of either category.

Category 11—This is another "Vote" category that is a match for the row and pixels count characteristics. The right side of the oval has four consecutive rows of four contiguous pixels. But since they are in the excluded right portion of the cell window, they are ignored. Even if the right side of the oval was shifted left into the center portion of the cell window by printing or ballot skew, it would still be ignored because the last category matched was category 4, which is excluded from the "Previous Category" characteristic 186. Therefore, category 11 is not deemed to be matched The final result of this anomalous reading is an error because the last category matched was category 4, which is the identifying category 183 having an "Error" mark type. If the CIS's reading capability has degraded to the point where a reading such as this can occur, then the ballot counting machine 1 should not be in operation. This, rather than rejection of marginal marks, is the primary reason for the "Error" messages.

The ability to customize the parameters of the IMR method for a particular type of response area allows for some flexibility in design. If a different type of response area 3 is desired, a control pixel value set could be customized for that particular application.

Figures 14, 15:
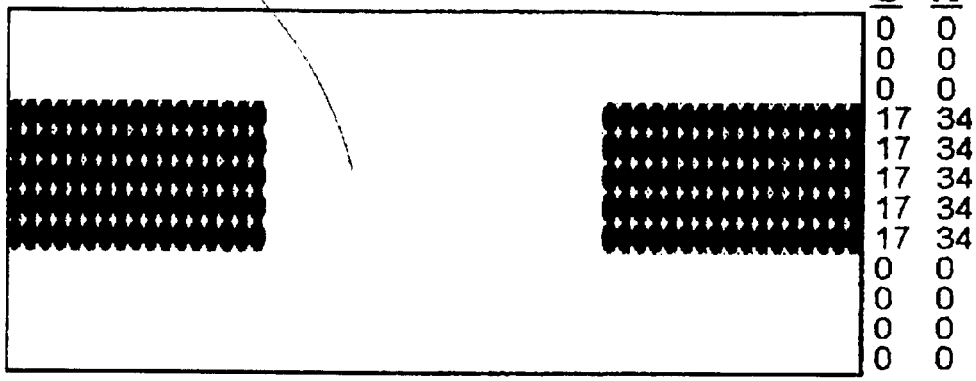
FIG. 14 is a table of categories of characteristics to be employed in the analysis of an optical scan of an arrow response area.
FIG. 15 is a diagram illustrating a working example of the data produced by an optical scan of a blank arrow response area.

For instance, certain voting equipment is designed to read "complete the arrow" response areas, or arrow response areas 5, as shown in FIG. 2. The control pixel value set for an arrow response area 5 is simpler than that for an oval response area 5. The "Cell Range" and "Previous Category" characteristics are not necessary. FIG. 14 is an example of a category table 190 correlating to an arrow response area 5. Like the category table 40 above, this category table 190 preferably includes mark codes. The category table 190 does not, however, include "Ignore" mark types, and only response pixel value sets that do not match any categories are disregarded as "Ignore" mark types. The mark codes 191 shown have the meanings assigned to them in Table 2.

TABLE 2

| Code | Description |
| --- | --- |
| E1 | A small dot or very thin line. To small to be considered a valid vote. Ballot rejected. |
| E2 | An abnormal reading caused by over-sensitivity, folds, out of spec ballots, or combination. Error. |
| V1 | A small dot or thin line, substantial enough to be considered a vote. |
| V2 | Arrow filled in at least half of is height. A vote. |
| V3 | A completely filled (or near complete arrow. A vote. |

Upon using a "complete the arrow" response sheet, the user is directed to fill in completely the area between the head and the tail of the arrow response area 5 indicating the appropriate choice. The IMR method 10 determines whether a mark has been made and if the mark indicates a choice, as shown in the following examples.

Example 6

FIG. 15 is an example of the response pixel value set derived from a blank arrow 202. The pixel counts for each row are displayed to the right of the image. The numbers under the heading "C" 204, indicate the highest number of contiguous pixels in that row. The numbers under the heading "N" 206, indicate the number of non-contiguous or total pixels in the row. In this example and the examples to follow, the cell window and the size of the response area are set so that the highest number of pixels that should appear in a scan of a blank arrow is 34. If the arrow is shifted to one side, the total number of pixels on each row will be consistent. The number of consecutive pixels will change, but there are no categories in the arrow table that monitor the consecutive pixel count. The response pixel value set derived from a blank arrow 202 does not match any categories in the category table 190 in FIG. 14 and is disregarded as an "Ignore" mark type.

Example 7

FIG. 16 is an example of the response pixel value set derived from a small dot 210 placed in the white space of the arrow response area. The dot 210 produced an image that is three pixels wide, and increased the pixel count in one row to 37. This response pixel value set would match only category 1 in the category table 212 in FIG. 16A. Category 1 is the identifying category 214 and indicates an "Error" mark type, allowing for the correction of the mark on the response sheet. Note that if the dot 210 had been only one pixel wide, the mark would have been disregarded as an "Ignore" mark type.

Example 8

FIG. 17 is an example of the response pixel value set derived from a single horizontal pen stroke 220 to connect the ends of the arrow response area. This line increased the pixel count in one row to 56. It would match categories 1 and 2 of category table 222 in FIG. 17A. Since category 2 is the last category matched and represents the identifying category 224, the IMR Method 10 will classify this mark as a "Vote" mark type.

The descriptions of specific steps employed in this method and equipment used to implement such method are exemplary and are not restrictive. Variations on the specific steps and on the equipment used may be used to achieve the results of this method.

Thus it can be seen that the invention accomplishes at least all of its stated objectives.

We claim:

1. A method of determining a choice made by a user by analyzing marks made on a response sheet by the user comprising the steps of:
   (a) providing a response sheet;
   (b) providing to a user means for making at least one mark on the response sheet wherein said at least one mark indicates at least one choice made by the user;
   (c) providing means for scanning images of said response sheet on which said at least one mark has been made and for converting said scanned images into data;
   (d) scanning said response sheet on which said at least one mark has been made;
   (e) converting said data produced by said means for scanning into a response pixel value set;
   (f) providing a control pixel value set;
   (g) analyzing said response pixel value set in relation to said control pixel value set to determine characteristics of said response pixel value set; and
   (h) determining said at least one choice made by the user by analyzing said characteristics.

2. The method according to claim 1 wherein scanning said response sheet is limited to at least one selected portion of said response sheet to produce a response pixel value set for each of said at least one selected portion of said response sheet such that analysis is conducted for each of said response pixel value sets.

3. The method according to claim 2 wherein each said at least one selected portion of said response sheet comprises a cell window that includes only one response area.

4. The method according to claim 2 wherein converting said data into a response pixel value set further comprises grouping each said response pixel value set in rows with each such row of said response pixel value set having a response number of pixels and analyzing each said response pixel value set includes analyzing said response number of pixels for each row.

5. The method according to claim 3 wherein converting said data into a response pixel value set further comprises grouping each said response pixel value set in multiple rows of pixels with each such row of pixels of said response pixel value set having a response number of pixels and said control value pixel set includes data for analysis of multiple rows of pixels such that said method further comprises comparing the response number of pixels for multiple rows of pixels of each response pixel value set with the data for analysis of multiple rows of pixels in said control value pixel set.

6. The method according to claim 5 wherein each of said multiple rows of pixels includes individual pixels, said multiple rows of pixels are scanned in a consecutive manner, and each response pixel value set is analyzed to determine whether said individual pixels in each said row of pixels are consecutive, and whether consecutive said rows contain individual pixels.

7. The method according to claim 6 wherein said response number of pixels for each of said multiple rows, whether the individual pixels in each of said multiple rows of said response pixel value set are consecutive, and whether consecutive said multiple rows contain individual pixels are considered characteristics and said analysis of said response pixel value set further includes determining the characteristics of the response pixel value set for each at least one cell window.

8. The method according to claim 7 wherein each row of said response pixel value set may be truncated and whether a row is truncated is considered a characteristic.

9. The method according to claim 8 wherein analysis further comprises classifying characteristics of a response pixel value set into different categories.

10. The method according to claim 9 wherein a category of a response pixel value set is a characteristic.

11. The method according to claim 5 wherein the control pixel value set includes a scale of possible valid and invalid codes and further comprising the step of assigning said response pixel value set a code on that scale.

12. The method according to claim 1 further comprising the steps of:
    providing at least one means for storing data, said data including the control pixel value set, the response pixel value set and said at least one choice made by the user; and storing the control pixel value set, the response pixel value set and said at least one choice made by the user on said means for storing data.

* * * * *

UNITED STATES PATENT AND TRADEMARK OFFICE
CERTIFICATE OF CORRECTION

PATENT NO. : 6,854,644 B1
DATED : February 15, 2005
INVENTOR(S) : Steve Bolton et al.

It is certified that error appears in the above-identified patent and that said Letters Patent is hereby corrected as shown below:

Column 4,
Line 53, delete "56 sensor" and insert -- 56-sensor -- therefore.

Column 7,
Line 17, delete "toom" and insert -- too -- therefore.

Column 8,
Line 14, delete "10(a" and insert -- 10 (a -- therefore.

Column 9,
Line 23, delete "189" and insert -- 189 -- therefore.
Line 48, delete "be matched" and insert -- be matched. -- therefore.
Line 66, delete "area 5" and insert -- area 8 -- therefore.

Column 10,
Line 6, delete "191" and insert -- 191 -- therefore.

Signed and Sealed this

Ninth Day of August, 2005

JON W. DUDAS
*Director of the United States Patent and Trademark Office*